(12) United States Patent
Brown

(10) Patent No.: US 6,966,095 B2
(45) Date of Patent: Nov. 22, 2005

(54) LINEAR-TRACKING WINDSHIELD WIPER SYSTEM FOR WIPING A RECTANGULAR FIELD

(76) Inventor: Robert Cushman Brown, 1207 Sandhurst Dr., Tallahassee, FL (US) 32312

( * ) Notice: Subject to any disclaimer, the term of this patent is extended or adjusted under 35 U.S.C. 154(b) by 70 days.

(21) Appl. No.: 10/807,820

(22) Filed: Mar. 24, 2004

(65) Prior Publication Data

US 2005/0210617 A1 Sep. 29, 2005

(51) Int. Cl.[7] .............................. B60S 1/44; B60S 1/26
(52) U.S. Cl. .............................. 15/250.21; 15/250.23; 15/250.29
(58) Field of Search ..................... 15/250.21, 250.23, 15/250.351, 250.29; 74/98

(56) References Cited

U.S. PATENT DOCUMENTS

| | | | |
|---|---|---|---|
| 2,607,065 A * | 8/1952 | Dahlgren ................. | 15/250.17 |
| 2,624,904 A * | 1/1953 | Wianco ................... | 15/250.23 |
| 3,590,415 A * | 7/1971 | Mori ...................... | 15/250.21 |
| 3,633,238 A * | 1/1972 | Parker .................... | 15/250.21 |
| 3,688,334 A * | 9/1972 | Peterson ................ | 15/250.21 |
| 4,245,369 A | 1/1981 | Clem | |
| 4,732,048 A | 3/1988 | Sakakibara et al. | |
| 4,847,941 A | 7/1989 | Kuhboch | |
| 4,991,252 A | 2/1991 | Budinski | |
| 5,093,953 A | 3/1992 | Eustache | |
| 5,408,719 A | 4/1995 | DeRees et al. | |
| 5,537,705 A * | 7/1996 | Battlogg ................. | 15/250.21 |
| 6,065,179 A * | 5/2000 | Hoshino ................. | 15/250.21 |

FOREIGN PATENT DOCUMENTS

| | | | | |
|---|---|---|---|---|
| EP | 0274992 | * | 8/1988 | |
| GB | 1190426 | * | 5/1970 | ............. 15/250.23 |
| GB | 1561813 | * | 3/1980 | |
| JP | 58-159073 | * | 9/1983 | |

* cited by examiner

Primary Examiner—Gary K. Graham
(74) Attorney, Agent, or Firm—Robert C. Brown

(57) ABSTRACT

A system for wiping a windshield of a vehicle in a rectangular field, comprising a wiper arm, a wiper blade assembly operationally attached to the wiper arm, and means for rotating and translating the wiper arm to cause said wiper blade assembly to track in a linear path across the windshield. The system includes a three-gear train for moving a pivot point on the wiper arm along a circular path centered on a virtual pivot point. The system is especially suited for wiping low aspect ratio windshields.

8 Claims, 15 Drawing Sheets

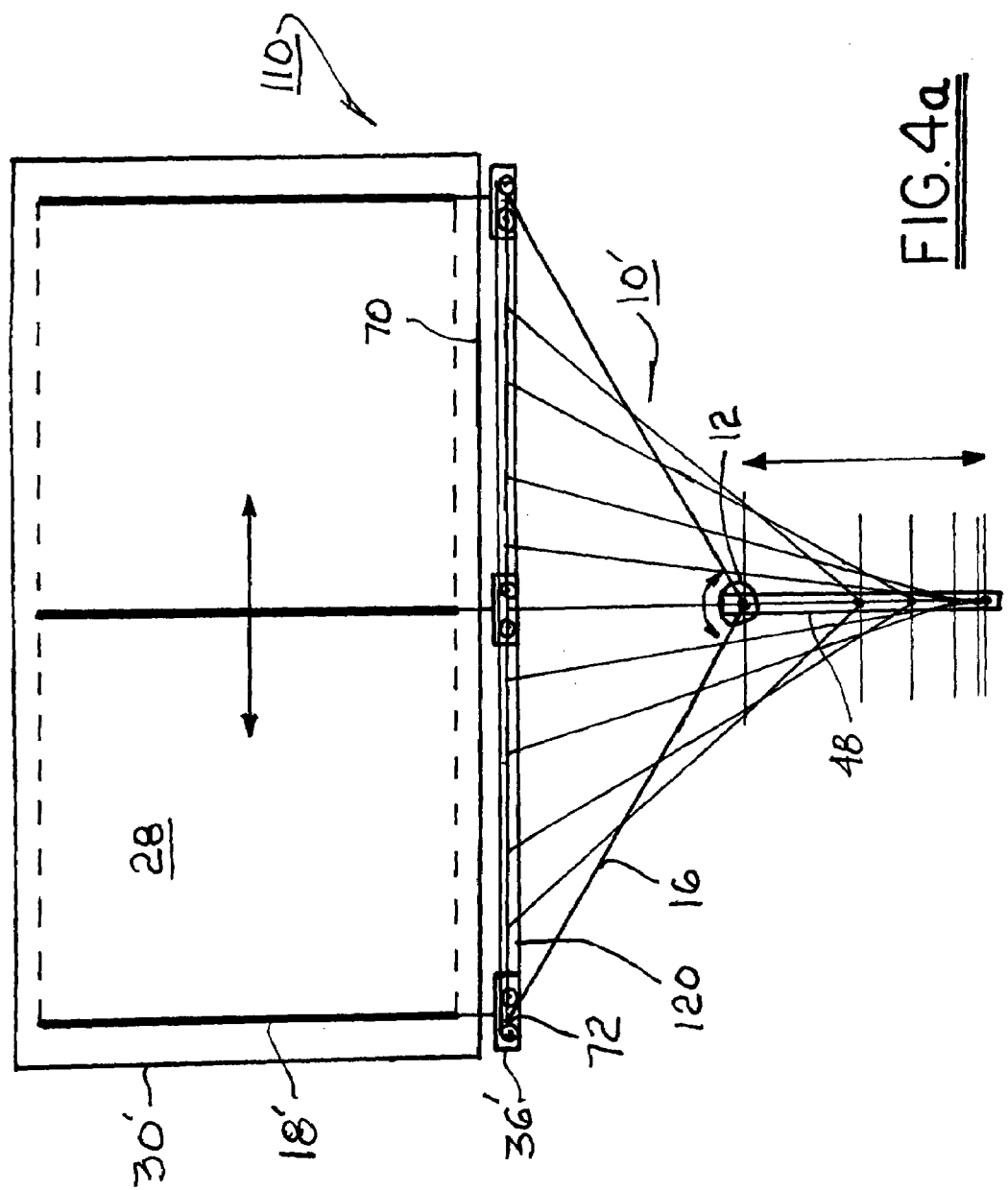

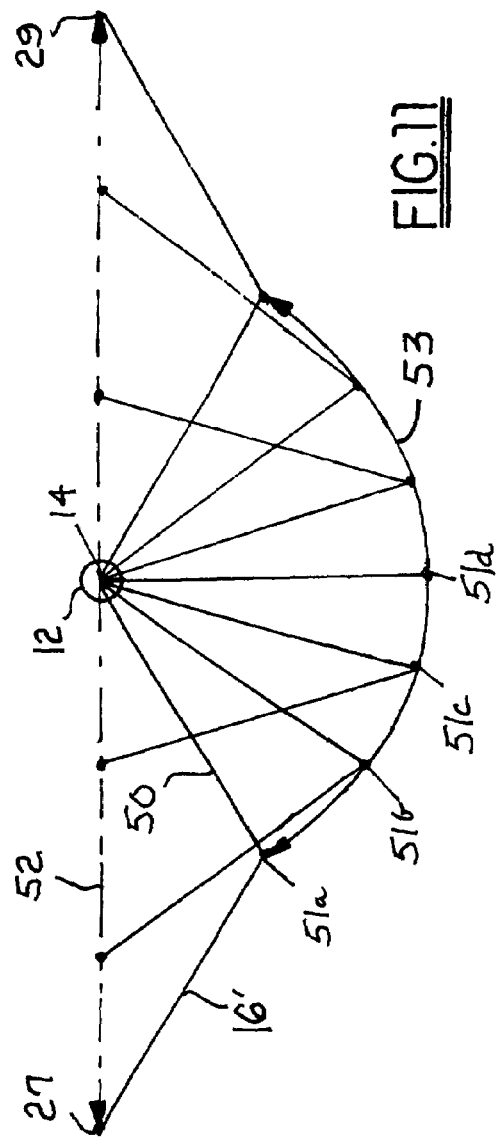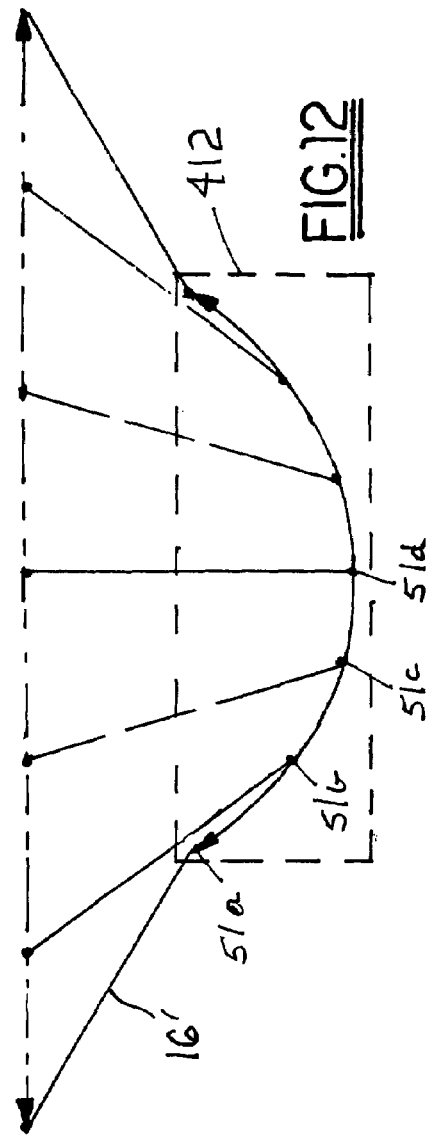

LINEAR-TRACKING WINDSHIELD WIPER SYSTEM FOR WIPING A RECTANGULAR FIELD

TECHNICAL FIELD

The present invention relates to means for wiping fluids from surfaces; more particularly, to wiping means including a blade for wiping moisture from vehicle windows; and most particularly, to a system for providing linear-tracking motion of a wiper arm and associated wiper blade to wipe a rectangular field on a vehicle window.

BACKGROUND OF THE INVENTION

Wiper systems for wiping moisture from vehicle windows are well known. A typical wiper system includes an oscillating motor that moves a wiper arm and attached wiper blade through a wiping arc of between about 90° and 180°. The wiping pattern produced by the blade is an arcuate area bounded on the ends by the extremes of blade travel and on the outer and inner edges by the radii of travel of the outer and inner tips of the wiper blade. It is a necessary consequence of a prior art oscillating system that window areas outside the wiping pattern are not wiped. Where the aspect ratio (defined herein as the height:width ratio of the surface to be wiped) is low, as in most current vehicle windshields, two such wiper systems may be required in tandem and having overlapping patterns. For extremely low aspect ratio windshields, as in some sports cars (for example, the E-type Jaguars), even three overlapping wiper systems are known.

On many current vehicles, such as hatchback and sport utility vehicles (SUVs), it is known to provide an oscillating wiper system for the rear windshield. The pivot location for the motor may be on the windshield itself or on the vehicle body; the pivot location may be at the top or the bottom of the windshield; and the pivot location may be anywhere to the left or right of center. All such known positions represent attempts by vehicle manufacturers to maximize the wiping effect of a single oscillating wiper system, or in other words, to minimize the geometric incompatability of an arcuate wiping pattern on a rectilinear window.

Prior art arcuate wiping patterns on vehicle rear windshields are annoying and dangerous to the operators of these and other vehicles. Whether by road spatter, vehicle exhaust, rain, or snow, during vehicle use under adverse road conditions the non-wiped areas rapidly become opaque and useless to a vehicle operator in seeing other vehicles to the rear or which may be attempting to pass. To keep non-wiped areas useful in such conditions, a vehicle operator must stop frequently and clean those non-wiped areas by hand; in practice, most drivers simply ignore those areas and drive with decreased rear-windshield visibility, at increased hazard to themselves, their passengers, and the occupants of other vehicles.

In the prior art, various approaches are known to increase the area of a windshield wiped by an oscillating wiper. See, for example, U.S. Pat. Nos. 4,732,048; 4,847,941; 4,991,252; 4,979,259; 5,093,953; 5,408,719. In these disclosures, various complex arrangements of gears, pistons, levers, and/or cams displace a wiper blade during its rotary oscillation such that a greater proportion of a windshield is wiped than would occur in a simple rotary oscillation. None of these inventions purports to sweep a fully rectangular area of a windshield, however.

U.S. Pat. No. 4,245,369 ('369) discloses an elegantly simple apparatus for using oscillating motion to drive a wiper blade in a straight line over a windshield surface, and for keeping the wiper blade in a vertical attitude during wiping. Thus, a true rectangular wiping pattern may be achieved. A wiper arm linkage oscillatingly driven by an attached motor about a fixed pivot point above the pivot end ("inner end") of the wiper arm in the y-axis direction causes the wiper arm pivot to be displaced upwards or downwards along a track in precisely the proportion needed to cause the other end ("outer end") of the wiper arm to track in a straight line across the windshield. A parallelogram linkage causes the associated wiper blade to remain vertical. This mechanism is discussed and shown in greater detail in the Detailed Description of the invention hereinbelow.

A drawback of this invention, however, is that it is useful over only relatively small angles of wiper arm oscillation. The example shown in the '369 patent is a 45° included angle (22½° half-angle), requiring a relatively short linkage and short displacement track, and resulting in a relatively narrow but truly rectangular wiping pattern. It will be seen, however, that as the included oscillation angle ("sweep angle") is increased, the length of the wiper arm, the length of the linkage, and the length of the track must increase non-linearly in proportion to the tangent of the half-angle. Depending upon the size and shape of the windshield, the fixed pivot point may be geometrically required to be on the windshield itself when the included angle is still less than 90°, a practical impossibility. When the included angle is 120°, as is desirable for wiping of a low aspect ratio windshield, the fixed pivot point is centered on the linear tracking line of the free end of the wiper arm, a clearly impractical situation. Thus, this invention wherein a fixed pivot point is disposed above a vertical track is not applicable singly to wide windshields having relatively low aspect ratios requiring large included wiping angles. Indeed, the '369 patent teaches in its FIG. 1 to use two such wiping systems, side-by-side and having overlapping fields, to cover a low aspect ratio windshield.

What is needed in the art is a windshield wiping system for a low aspect ratio-windshield, and especially for a rear-windshield, that employs a linear-tracking single wiper arm assembly to wipe a rectangular pattern covering a very high percentage of the total windshield area.

What is further needed is such a system wherein the linear tracking motion is provided by mechanical transformation of the rotary motion of an oscillating motor, preferably a single motor.

It is a principal object of the present invention to wipe a large percentage of the surface area of a low aspect ratio windshield in a rectangular field by employing a single linear-tracking wiper mechanism.

SUMMARY OF THE INVENTION

Briefly described, a linear-tracking windshield wiper system in accordance with the invention includes a wiper arm having inner and outer ends; oscillatory means for pivoting the wiper arm about the inner end; and means for simultaneously displacing the oscillatory means in the x and/or y direction such that the outer end of the wiper arm follows a reciprocating linear track across the windshield.

The system may take the form of any of several embodiments. (For purposes of discussion herein, a windshield is considered to exist in an x-y plane wherein the x-axis is generally horizontal and the y-axis is generally vertical and orthogonal to the x-axis. Horizontal, vertical, up, down, above, and below are used conventionally herein with respect both to the earth and to a vehicle on level ground. A z-axis extends orthogonally through the x-y plane. The wiper arm moves in the x and y directions. It should be understood that non-planar windshields having significant y- an z-axis curvature and which also may be angled from vertical are fully comprehended by the invention.)

In a first embodiment, a wiper arm is attached at its inner end to the rotor of an oscillatory motor having a stator disposed in a vertical track, and the outer end extends over the windshield. A linear actuator, such as a linear stepper motor, displaces the oscillatory motor along the vertical track in accordance with the angular position of the wiper arm assembly such that the outer end of the wiper arm describes a straight line in the x-direction across the windshield. Such coordination is readily provided electronically, for example, via a microchip and position sensors on the motor and linear actuator. To maintain a constant vertical (y-direction) attitude of a wiper blade assembly attached to the wiper arm, a control arm parallel to the wiper arm connects the wiper blade assembly to the motor stator. This motion is identical to that produced by the mechanism of U.S. Pat. No. 4,245,369 as discussed above, but improves upon that mechanism in that the linear actuator, which replaces the pivot point and pivotable linkage, may be placed within the mechanism such that it does not overlap the windshield in low aspect ratio applications.

In a second embodiment, a pivot element; is provided for supporting a wiper arm, slidably and pivotably disposed on the pivot element, such that the wiper arm can simultaneously rotate about the pivot axis and slide past the pivot axis during oscillation. The inner end of the wiper arm supports a roller that travels in a first cam groove formed in a plate supporting the pivot element. The cam groove guides the inner end along a curved path that causes the wiper arm to be simultaneously pivoted about the pivot axis and translated past the pivot axis such that the outer end of the wiper arm, extending over the windshield, describes a straight line across the windshield. A slotted actuation arm is attached to an oscillatory motor, the slot engaging a pin at the arm inner end to drive the inner end rotationally about the motor axis at a varying radius dictated by the cam groove. As in the first embodiment, to maintain a constant vertical attitude of a wiper blade assembly attached to the outer end of the wiper arm and extending over the windshield, a parallel attitude control arm connects the wiper blade assembly to a tab at the inner end of the wiper arm. The rotational speed of the oscillatory motor may be varied to vary the translational speed of the wiper blade assembly.

In a third and currently preferred embodiment, a rack portion of a ring gear is fixed to a mounting plate as a first gear in a three-gear train. A second gear is driven along the first gear in a first circular path by a motor having a rotor attached to the second gear and a stator disposed in an arcuate track coaxial with the ring gear. A third gear supports a wiper arm and is urged along a second circular path coaxial with the ring gear and motor track, the axis of the third gear defining the inner pivot point of the wiper arm, and the motion of the wiper arm being identical to that provided by a pivoting link as shown in the '369 patent. Advantages of this embodiment over the '369 mechanism are that the central pivot, pivoting link, and vertical track are all eliminated. The result is a relatively compact apparatus having a minimal vertical space requirement, requiring no pivot point on the windshield surface, and easily disposable within the tailgate of a sport utility or hatchback vehicle.

In a variation of the third embodiment, at least one of the first and third gears is non-circular, defining a cam gear, and the first and second paths are arcuate but not circular.

BRIEF DESCRIPTION OF THE DRAWINGS

The present invention will now be described, by way of example, with reference to the accompanying drawings, in which:

FIG. 4a is a schematic drawing showing a first embodiment of a windshield wiping system in accordance with the invention;

FIG. 11 is a schematic view of prior art mechanism 10" as shown in FIG. 4, with lower elements removed;

FIG. 12 is a schematic view of the mechanism shown in FIG. 11, with the motor, pivot point, and actuating links removed;

DESCRIPTION OF THE PREFERRED EMBODIMENTS

Figure 1:
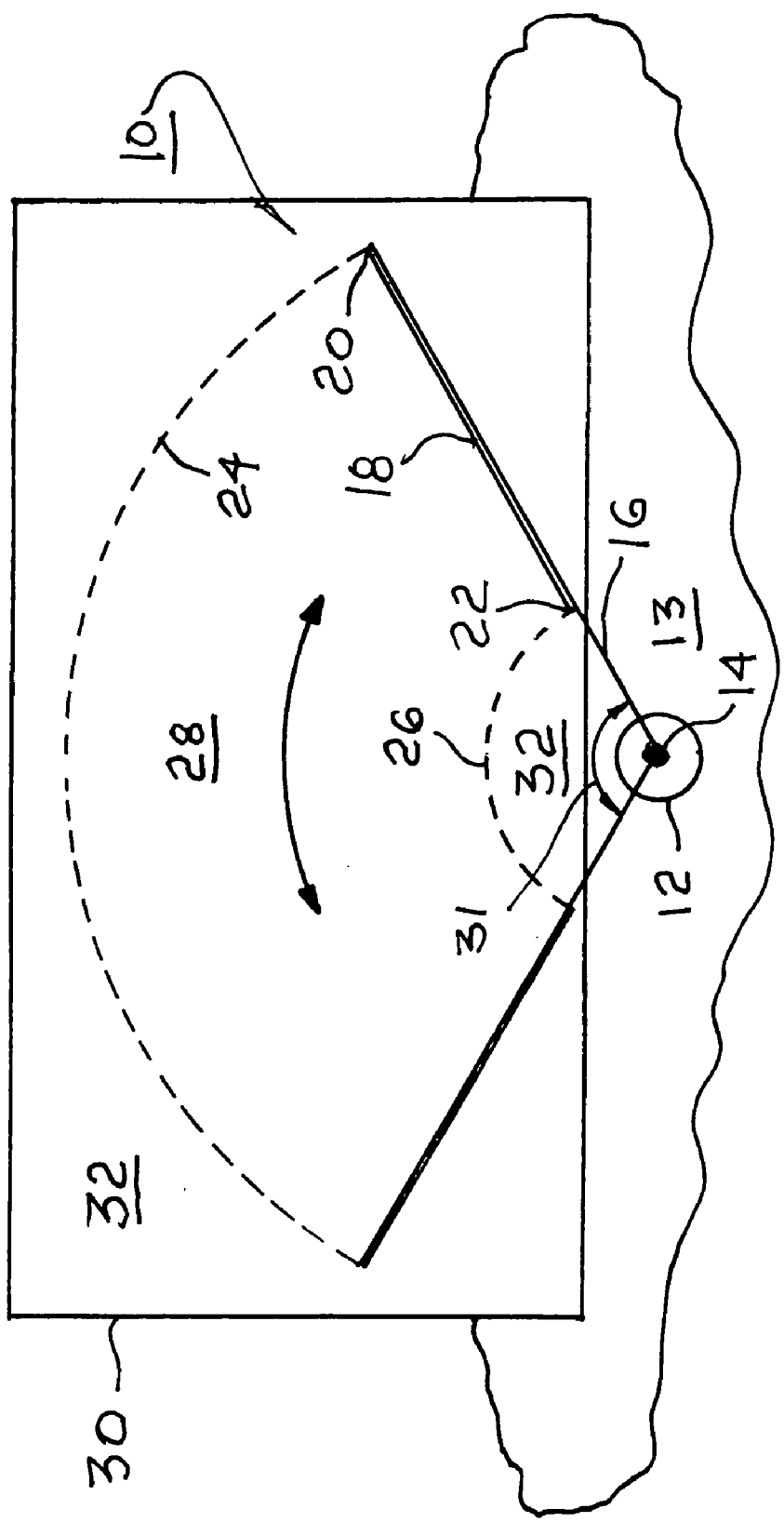
FIG. 1 is a schematic drawing showing a simple prior art oscillating windshield wiping system.

Referring to FIG. 1, a first prior art oscillating wiper system 10 includes an oscillating electric drive motor 12 mounted on a vehicle 13 and having a rotor for rotation about a pivot point 14, the rotor being connected to a wiper arm assembly 16 supporting a wiper blade 18. Blade 18 includes outer and inner ends 20,22 that define corresponding outer and inner edges 24,26 of a wiping field 28 on a windshield 30. System 10 sweeps through an included arc 31. Areas 32 outside field 28 are not wiped by system 10.

Figure 2:
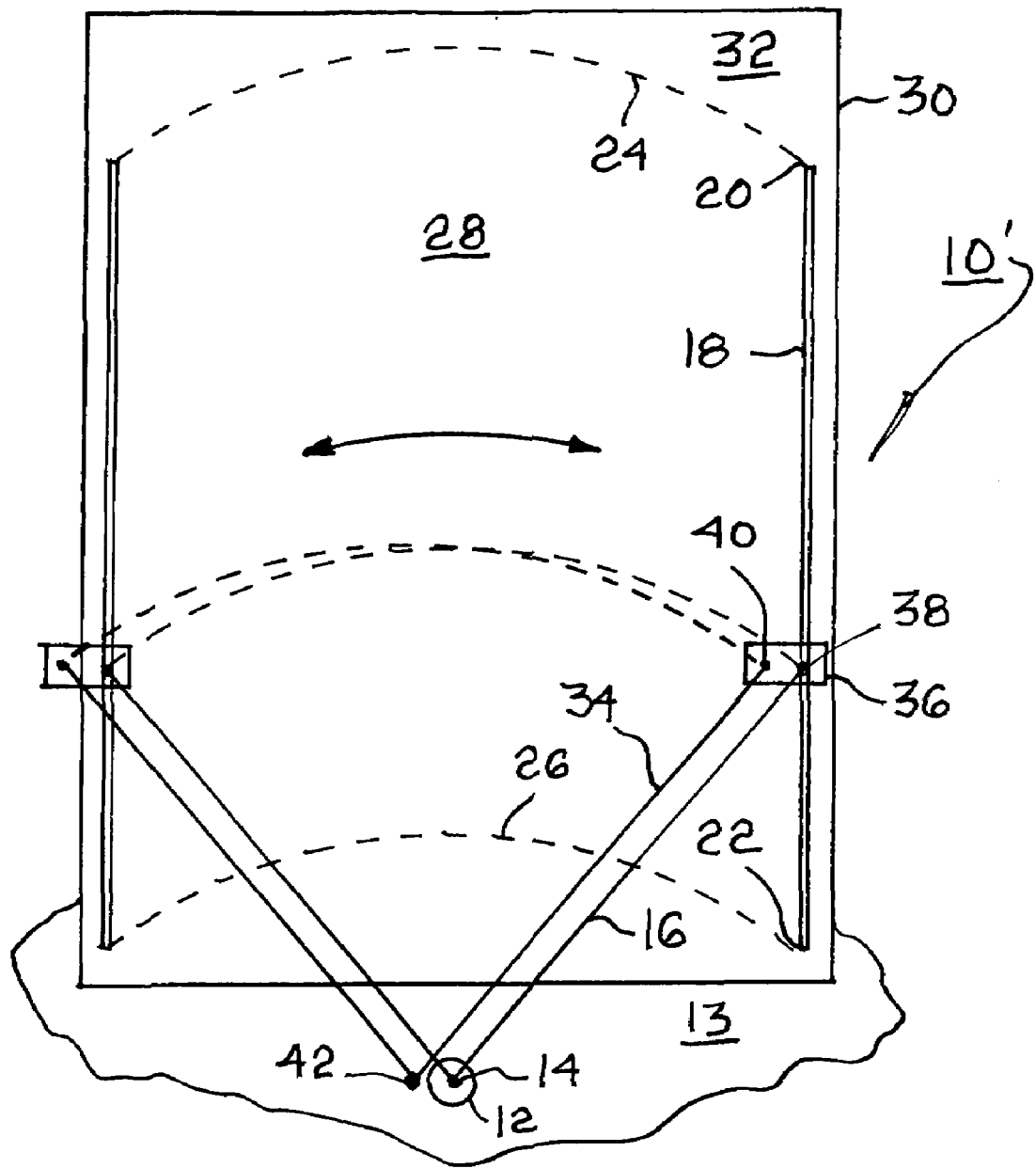
FIG. 2 is a schematic drawing showing a prior art oscillating windshield wiping system having a parallelogram linkage for maintaining the wiper blade in a vertical attitude.

Referring to FIG. 2, a second prior art oscillating wiper system 10' includes all the elements of system 10, but further comprises an attitude control arm 34 and a tab 36 to which wiper blade 18 is non-pivotably mounted. Wiper arm 16 is pivotably mounted to tab 36 at point 38. Attitude arm 34 is pivotably mounted to tab 36 at point 40 and to vehicle 13 at point 42 to form a conventional parallelogram arrangement with wiper arm 16, control arm 34, pivot point 14, and points 38,40,42 that keeps wiper blade 18 vertical at all points of oscillation of wiper arm 16. The wiped field shown in prior art FIG. 2 has vertical, parallel left and right boundaries and arcuate upper and lower boundaries. Such a field is defined and referred to herein as a "rectarcuate" field.

Figure 3:
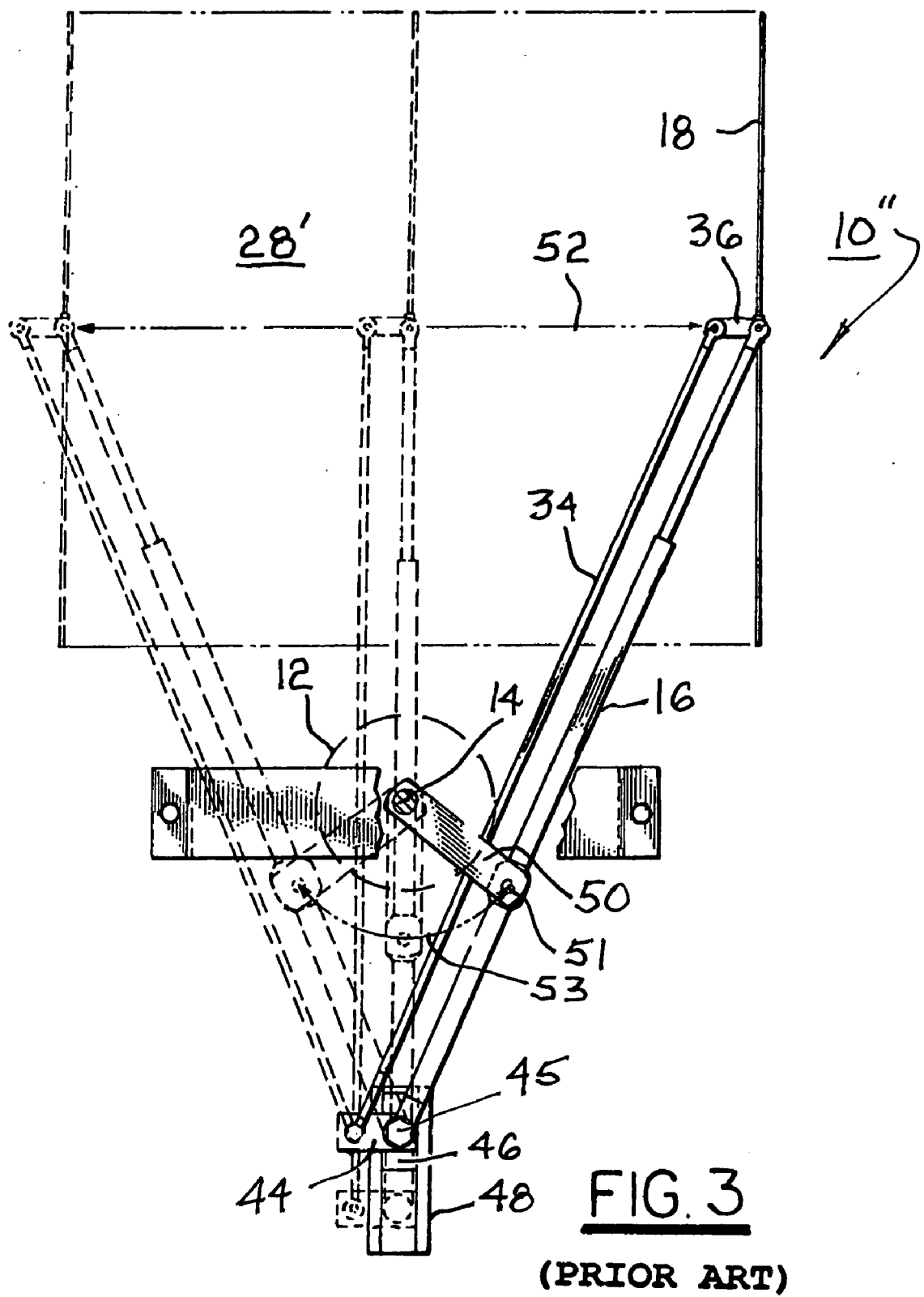
FIG. 3 is an elevational view, partially schematic, of a prior art linear-tracking windshield wiping system as disclosed in U.S. Pat. No. 4,245,369.

Referring to FIG. 3, a third prior art oscillating wiper system 10″, substantially as disclosed in the '369 patent, includes a wiper arm 16 pivotably connected to a tab 36 and to a second tab 44 at pivot point 45 on a car 46 slidably disposed in a vertical track 48. As in embodiment 10′, an attitude control arm 34 is pivotably connected to form a parallelogram arrangement for keeping wiper blade 18 vertical at all points of oscillation of wiper arm 16. An oscillation link 50 is pivotably connected to wiper arm 16 at an intermediate point 51 thereupon and is connected to the rotor of an oscillating motor 12 (disposed above the plane of FIG. 3 to permit the wiping mechanism to swing across center). The length of link 50 and its attachment point on wiper arm 16 are selected such that reciprocating travel of car 46 in track 48 imposed by link 50 exactly compensates for the otherwise arcuate motion of tab 36, causing tab 36 to follow a reciprocating linear path 52 during oscillation of motor 12. Thus, point 51 describes an arc 53 centered on pivot point 14 as wiper blade 18 sweeps a rectangular area 28′.

Figure 4:
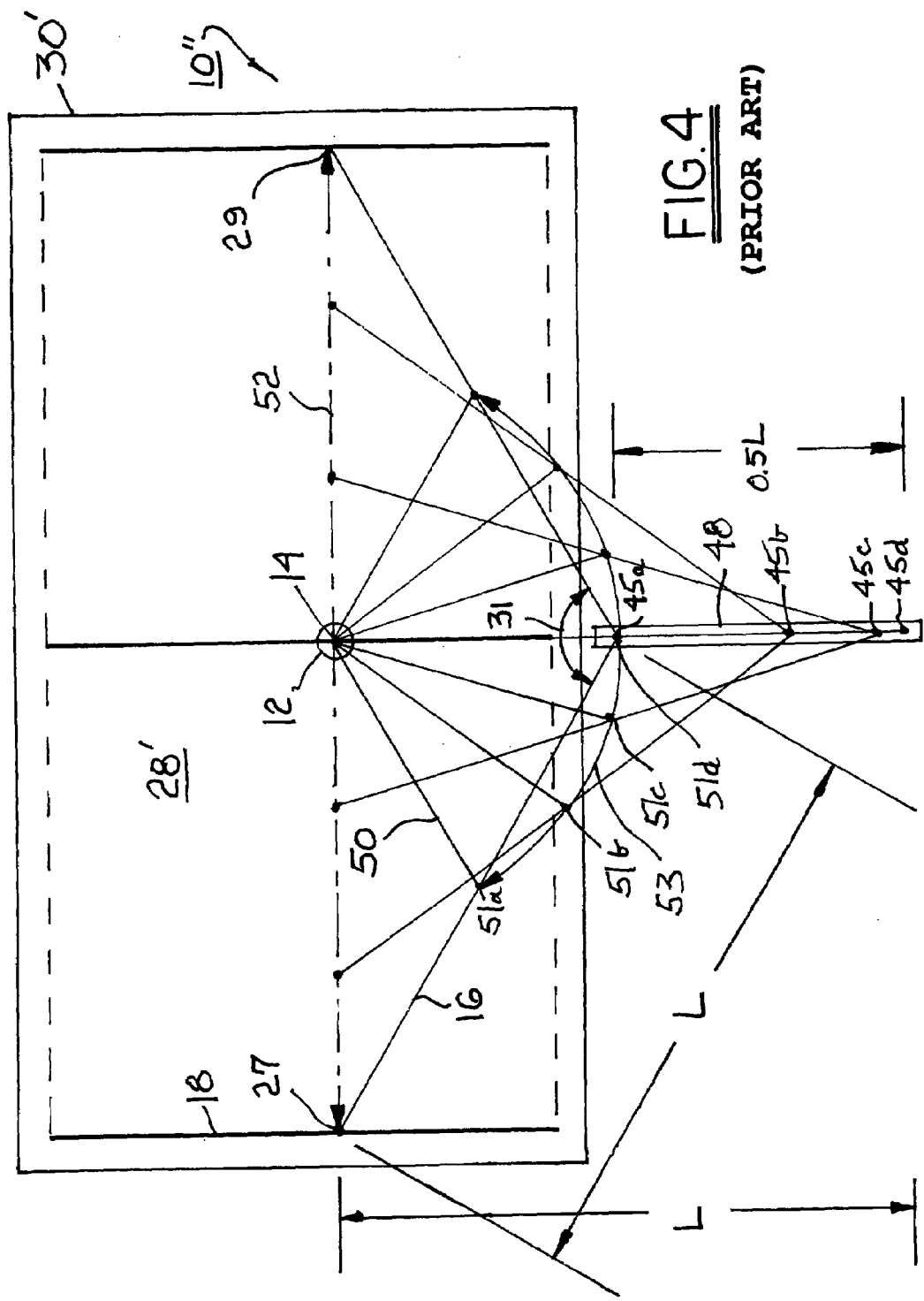
FIG. 4 is a schematic drawing showing the inapplicability of the system shown in FIG. 3 to low aspect ratio windshields requiring large included wiping angles.

Referring to FIG. 4, a low aspect ratio windshield 30′ (for example, 1:2) is shown in conjunction with prior art oscillating wiping system 10″ adapted for a low aspect ratio application. The purpose of FIG. 4 is to demonstrate the impracticality of applying prior art system 10″ to single-system wiping of low aspect ratio windshields. (For clarity, the parallelogram arrangement from FIG. 3 is omitted, as it is not necessary to the present discussion.)

For convenience, a wiper oscillation included sweep angle 31 of 120° is selected as representative of a low aspect windshield application. A 120° system makes the relationships easy to deal with geometrically, although similar wide angles are equally applicable. Wiper arm 16 has a length L, as required for displacing wiper blade 18 to its farthest extremes at the left 27 and right 29 of rectangular pattern 28′. At the midpoint of its oscillation, wiper arm 16 must be effectively shortened by exactly 50%, which is achieved by displacing wiper arm pivot 45 along track 48 from pivot point 45a through points 45b and 45c to point 45d. This is accomplished by oscillating link 50 by motor 12 until point 51 moves along arc 53 from point 51a through points 51b and 51c to point 51d, which coincides with the previous location of point 45, point 51 being at the midpoint of wiper arm 16. (Of course, in an actual full cycle, the arm would continue on to point 29 and back, which action is omitted here for brevity.) Thus, link 50 is exactly one-half the length of wiper arm 16, and the length of track 48 is also exactly one-half the length of wiper arm 16. This relationship places motor 12 and pivot point 14 on linear path 52, which is in the middle of windshield 30′! Thus, apparatus 10″ is not applicable to such low aspect ratio uses, and a different and improved invention is required.

The problem with applying wiper system 10″ to relatively low aspect ratio windshields is that the pivot point 14 for actuation of the wiper arm lies well above the range of travel (0.5 L) of the inner or pivot end 45 of the wiper arm. Pivot point 14 therefore progressively encroaches onto the windshield surface as sweep angle 31 is increased, thereby increasing the length of wiper arm 16 and the resulting lengths of link 50 and track 48.

Referring to FIG. 4a, in a first embodiment 110 derived from prior art embodiment 10″ in FIG. 4, the entire mechanism 10′ can be lowered below the lower edge 70 of the windshield, and the outer end 72 of wiper arm 16 provided with a car 36′ to which a wiper blade assembly 18′ is vertically attached. Car 36′ is disposed in a linear track 120, thus obviating the need for an attitude arm such as arm 34 in FIG. 3. Two disadvantages of this approach are 1) an additional track and car are required, and the track must run the entire width of the windshield to be wiped; and 2) the entire apparatus is ungainly, occupying a large part of the vertical extent of a vehicle tailgate. The mechanism will, however, serve to wipe a rectangular field 28.

Clearly, a rectangular field 28 requires a linear track 120 for car 36′. For other than a rectangular field, for example, a rectarcuate field (FIG. 2), a non-linear track is useful.

Figure 5:
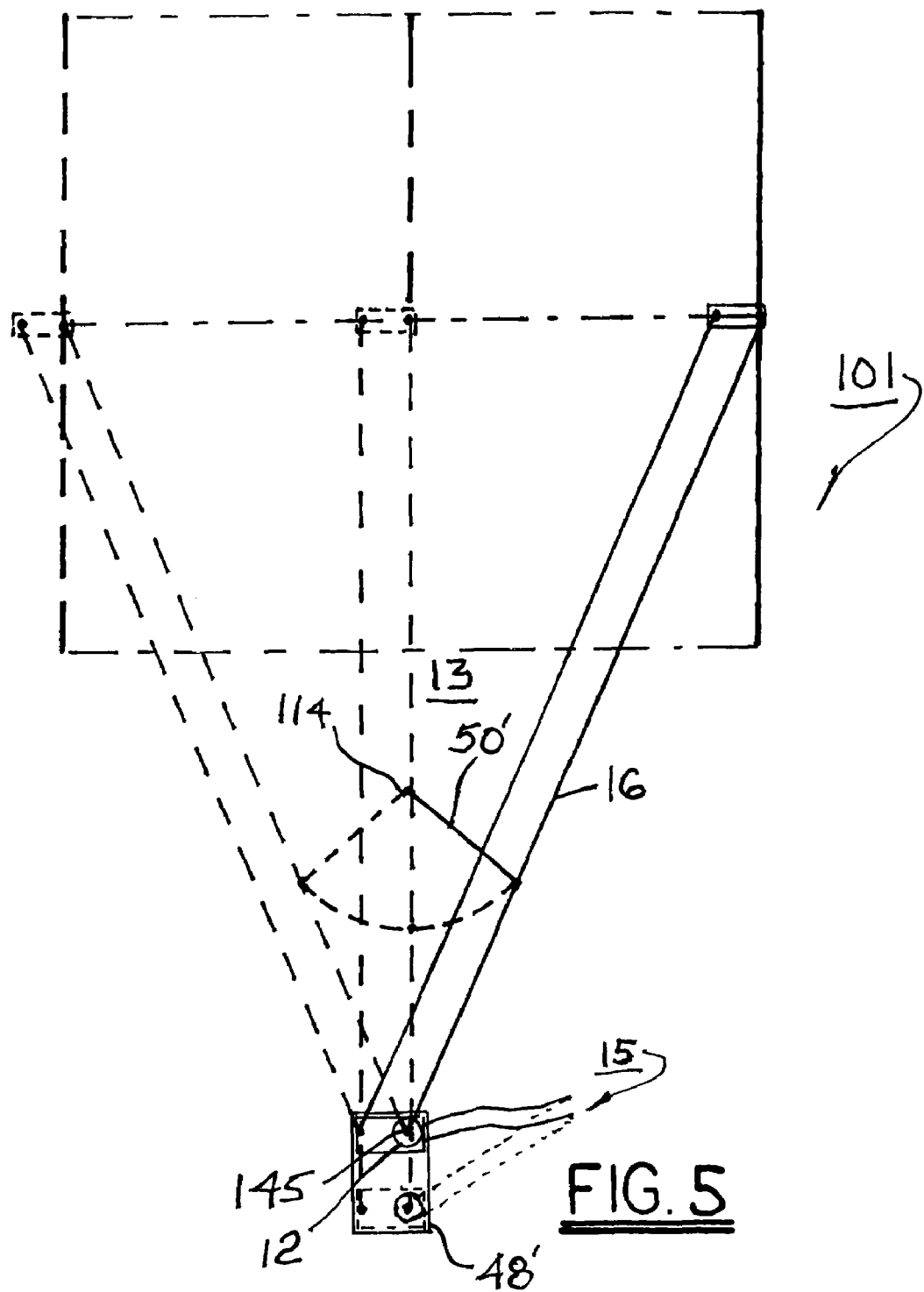
FIG. 5 is a schematic drawing of an improvement on the high aspect ratio windshield wiping system disclosed in the '369 patent.

In passing, and referring to FIG. 5, it should be noted that the narrow-angle wiping apparatus 10″ of the '369 patent may be substantially improved (embodiment 101) by moving the motor means from pivot point 114 to pivot point 45, attaching the end of wiper arm 16 to the motor rotor, and providing motor 12 with a stator restrained from rotation by engagement with track 48′ but vertically slidable therein. Link 50′ is thus a simple arm pivotably connected at its upper end to a pivot point 114 on vehicle 13 and at its lower end to wiper arm 16 as in the prior art. The motor 12 is provided with flexible leads 15 to permit travel of the motor within the track. An advantage of this arrangement of the '369 apparatus is elimination of the bridge structure required therein to support the motor over point 114 (point 14 in the prior art), and a consequent lowering of the profile of the entire apparatus.

Figure 6:
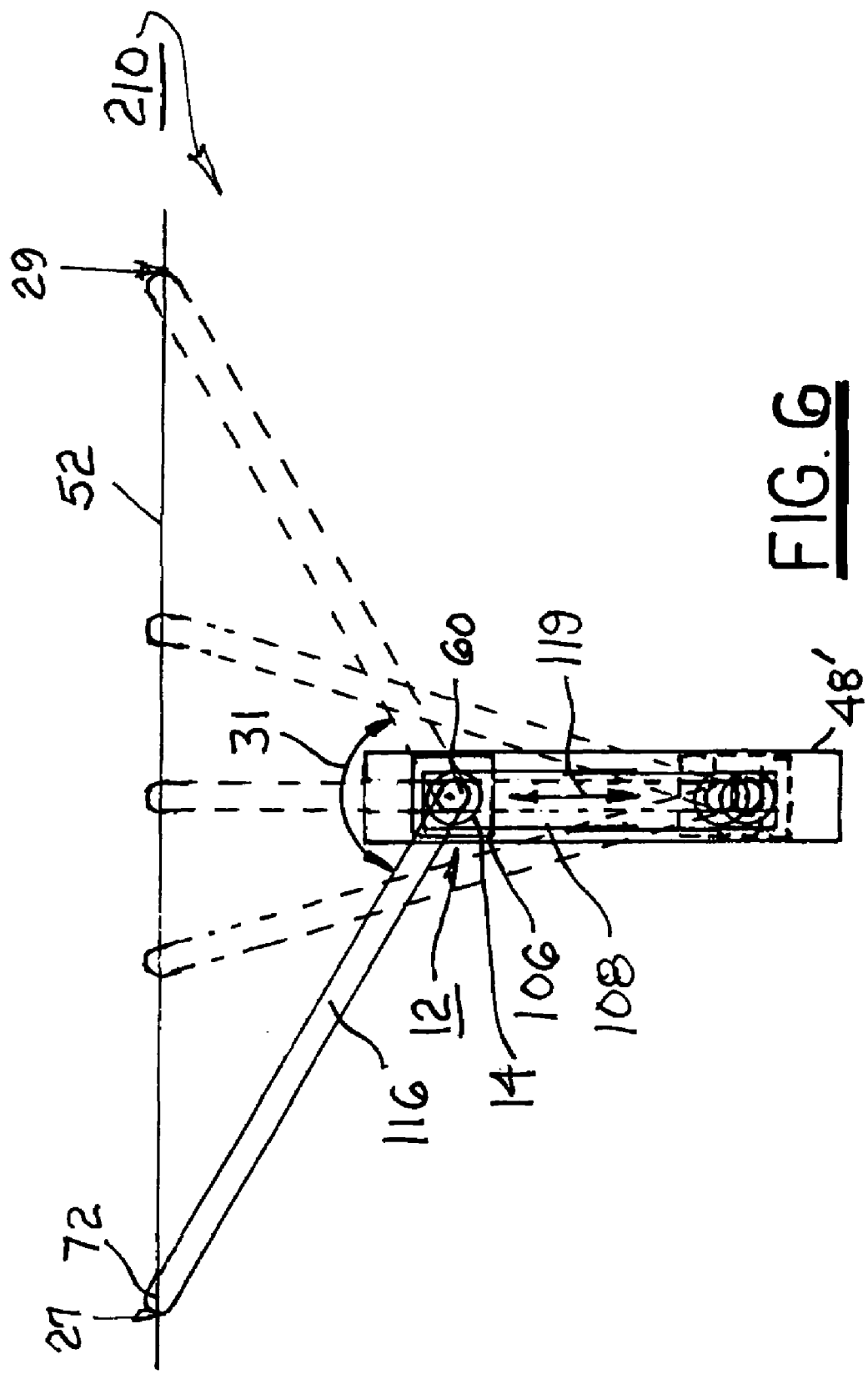
FIG. 6 is a schematic drawing of a portion of a second embodiment of a windshield wiping system in accordance with the invention, showing the actuating mechanism.

Referring to FIG. 6, a second embodiment 210 of a mechanism for moving an upper wiper arm end 72 reciprocally along a horizontal linear path 52 on a low aspect ratio windshield includes a vertical track 48′ for reciprocally guiding a stator 106 of an oscillatory motor 12. Stator 106 is prevented from rotation during reciprocation within track 104 as by being rectangular, as shown. A rotor of motor 12 is attached to wiper arm 116 for conventional oscillation 117 thereof between the extremes 27,29, for example, through a central sweep angle 31 of 120°. The apparatus as described thus far is substantially the same as that shown and intended for embodiment 110 shown in FIG. 4a. However, instead of a link 50 or 50′, a linear actuation means 108, such as a linear stepper motor, piston, solenoid, or other linear displacing means, displaces the oscillatory motor 12 reciprocally 119 along vertical track 48′ in coordination with the angular position of wiper arm 116 such that wiper arm end 72 describes a straight line 52 in the x-direction. Such coordination is readily provided electronically in known fashion, for example, via a microchip and position sensors on the motor and linear actuator (not shown). Other such means are well known to one of ordinary skill in the position sensing arts and need not be elaborated upon here. A distinct advantage of embodiment 210 is that the means for displacing motor 12 may be disposed parallel to track 48′, for example, in front of or behind, which serves to shorten the vertical dimension of the apparatus, removes the need for pivot point 14 shown in FIG. 4, and thus permits use of this mechanism on low aspect ratio windshields. A disadvantage is that embodiment 210 requires two separate actuation mechanisms, motor 12 and linear actuation means 108, and coordination between them.

Figure 7:
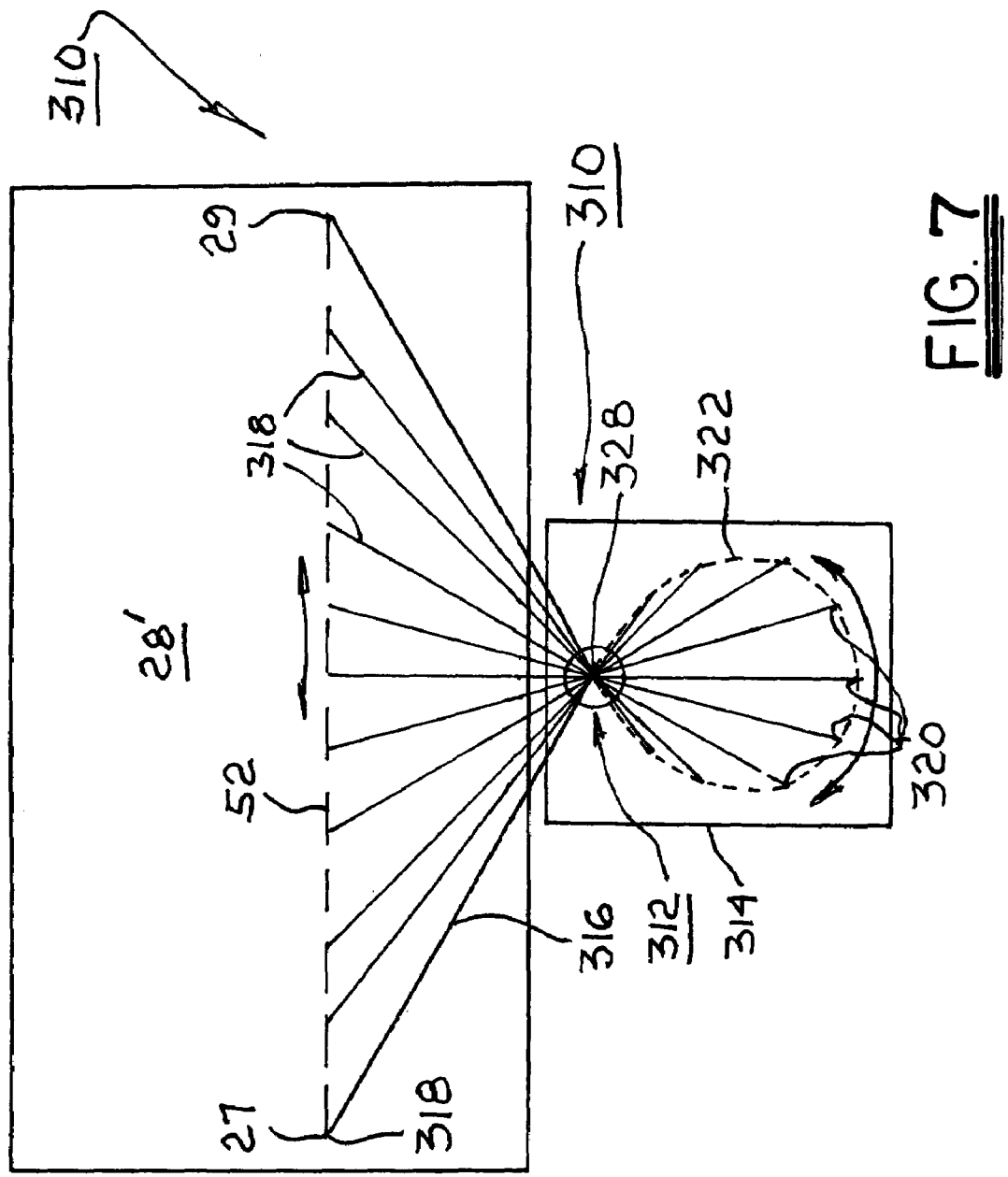
FIG. 7 is a schematic drawing of a third embodiment of a windshield wiping system in accordance with the invention, showing the path of a cam groove for retracting and advancing a wiper arm through a pivot element.

Referring to FIGS. 7 through 10, a third embodiment 310 is shown schematically in FIG. 7. A wiper arm 316 is slidably disposed in a pivot means 312 rotatably disposed on a mounting plate 314 for pivoting about a pivot point 328. In order for outer end 318 of arm 316 to reciprocally follow a track 52, preferably but not necessarily linear, across wiping field 28' between left extreme 27 and right extreme 29 (the wiper blade being omitted for simplicity), arm 316 must be functionally shortened and lengthened during oscillation thereof. Both the shortening/lengthening and the oscillation are accomplished and coordinated by causing the inner end 320 of arm 316 to be drawn along path 322 while arm 316 slides through pivot means 312 as required.

Figure 8:
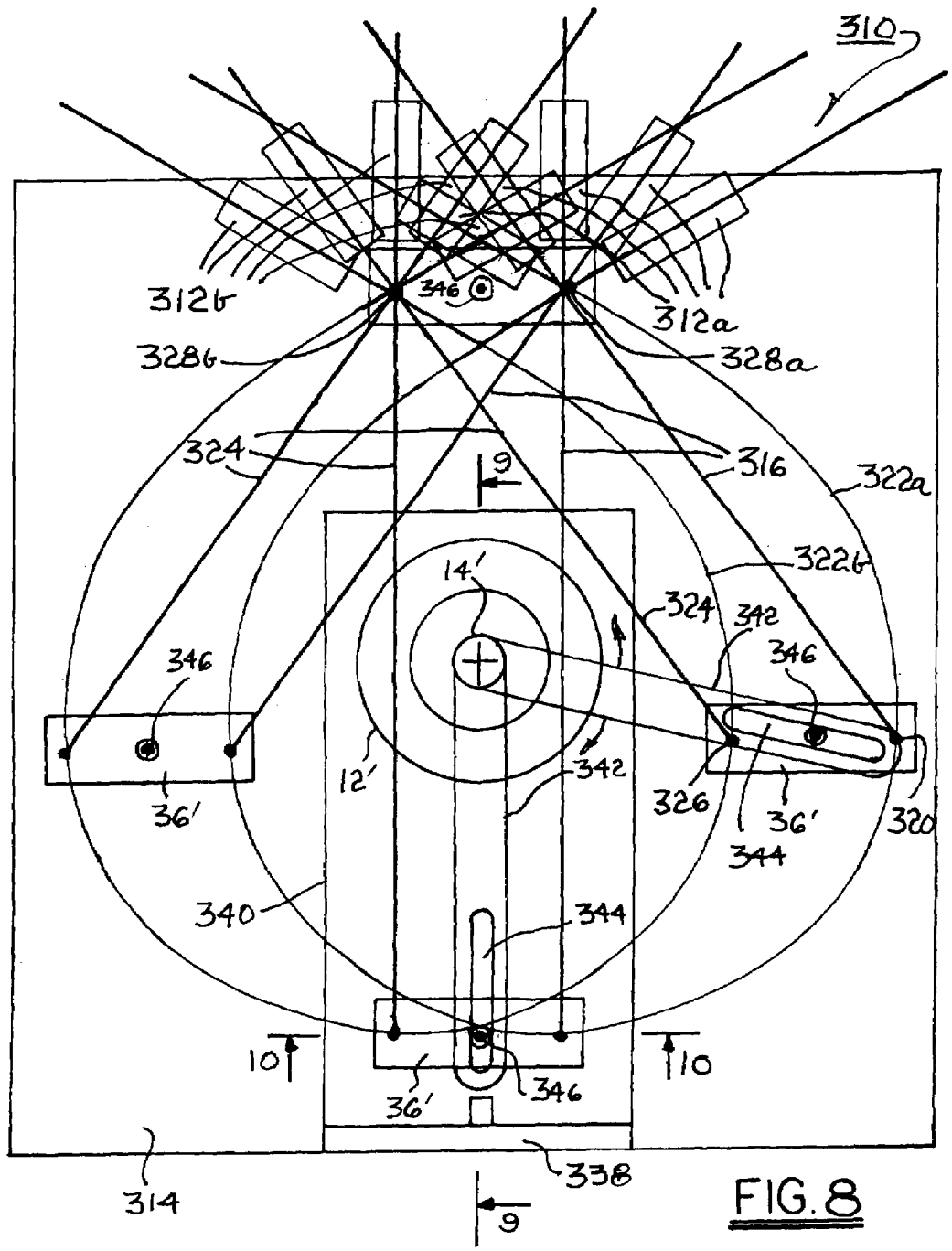
FIG. 8 is a detailed schematic view of a cam-groove actuating mechanism for the third embodiment shown in FIG. 7.

Referring to FIG. 8, a detailed schematic drawing of the motions involved in embodiment 310 is shown, including the participation of a wiper attitude arm 324 in a parallelogram arrangement for maintaining a wiper blade assembly (not shown) in a vertical attitude. FIG. 8 shows several positions of the mechanism during a single cycle thereof.

Wiper arm 316 is pivotably attached at its inner end 320 to a tab 36', and wiper attitude arm 324 also is pivotably attached at its inner end 326 to tab 36' at a distance from end 320. The outer ends of arms 316,324 (not shown) are attached conventionally to an outer tab 36, as shown in the prior art in FIG. 2, to define a parallelogram arrangement among the arms and the tabs. Wiper arm 316 is slidably diposed in a first pivotable guide 312a, and attitude arm 324 is slidably disposed in a second pivotable guide 312b spaced apart from pivotable guide means 312a by the same distance as the spacing between arm ends 320,326. Each of guides 312a,312b is pivotable about points 328a,328b, respectively.

Figure 9:
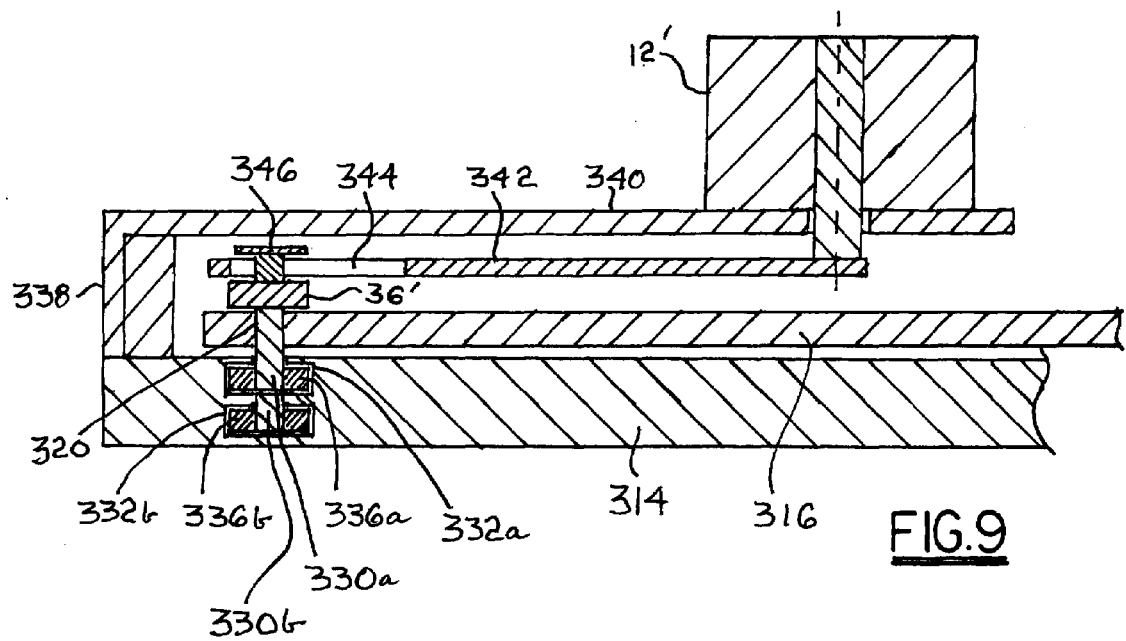
FIG. 9 is an elevational cross-sectional view taken along line 9—9 in FIG. 8.
Figure 10:
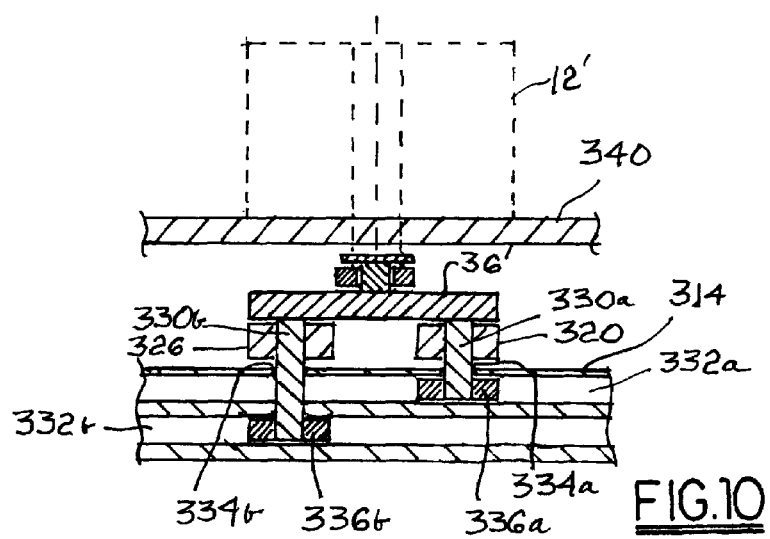
FIG. 10 is an elevational cross-sectional view taken along line 10—10 in FIG. 8.

Referring now to FIGS. 8 through 10, a first fixed pivot post 330a extends from tab 36' through wiper arm end 320 into a first slot 332a formed in mounting plate 314. Preferably, slot 332a is formed as a lenticular slot having a narrow entrance 334a through which post 330a enters, and post 330a is provided with a roller 336a for tracking post 330a in slot 332a. Post 330a and roller 336a define second wiper arm guide means, and entrance 334a and slot 332a define third wiper arm guide means. Similarly, a second fixed pivot post 330b extends from tab 36' through attitude arm end 326 into a second slot 332b formed in mounting plate 314. Preferably, slot 332b is formed as a lenticular slot at a different depth from slot 332a, such that the two slots are completely independent, and having a narrow entrance 334b through which post 330b enters, and post 330b is provided with a roller 336b for tracking post 330b in slot 332b. Post 330b and roller 336b define second attitude arm guide means, and entrance 334b and slot 332b define third attitude arm guide means.

An angled bracket 338 extends from plate 314 for supporting a second plate 340 parallel to mounting plate 314. A motor 12' is mounted on second plate 340 having a rotor extending therethrough. An actuation arm 342 is mounted on the rotor for rotation thereby. Actuation arm 342 is provided with a slotted opening 344 for receiving a capped post 346 extending from tab 36' at a location substantially midway between posts 330a,330b.

In operation, during a wiper cycle across a windshield, motor 12' rotates arm 340 through 360°, beginning at top dead center. For example, for arm end 318 to traverse from point 27 to point 29 (FIG. 7), arm 342 rotates a full turn in a clockwise direction, carrying tab 36' and arms 316,324 with it. Tracks 332a,332b are formed in plate 314 in such a way that, as arms 316,324 are drawn along tracks 332a,332b and through pivot guides 312a,312b, outer end 318 is drawn directly along path 52 in a linear fashion to point 29. Motor 12' is immediately reversed and turns through 360° counterclockwise, and the preceeding motions are all reversed, returning outer end 318 directly along path 52 in a linear fashion back to point 27. The motor direction is again reversed, and a new cycle is begun.

Referring to FIGS. 11 through 14, a currently-preferred fourth embodiment 410 is disclosed. First considering prior art FIG. 4, it is seen that track 48 and the inner half of wiper arm 16 exist solely to cause the entire wiper arm 16 to pivot correctly about point 51 as the arm traverses across the windshield.

Thus, what is needed is a mechanical equivalent to the inner half of wiper arm 16 and track 48, elimination of which is shown in FIG. 11, to move point 51 along arc 53 while pivoting the wiper arm appropriately. Eliminating the inner half of arm 16 and track 48 provides a much more compact mechanism, shown schematically in FIG. 11, requiring only the outer half 16' of wiper arm 16.

Since pivot point 14 and motor 12 unacceptably fall in the middle of field 28' when one attempts to use prior art mechanism 10" at relatively large wiper sweep angles for low aspect ratio windshields, as shown, in FIG. 4, what is further need is a mechanical equivalent to wiper link 50 and removal of pivot point 14 and motor 12, as shown in FIG. 12. All the essential elements from FIG. 4 then fall within box 412.

Figure 13:
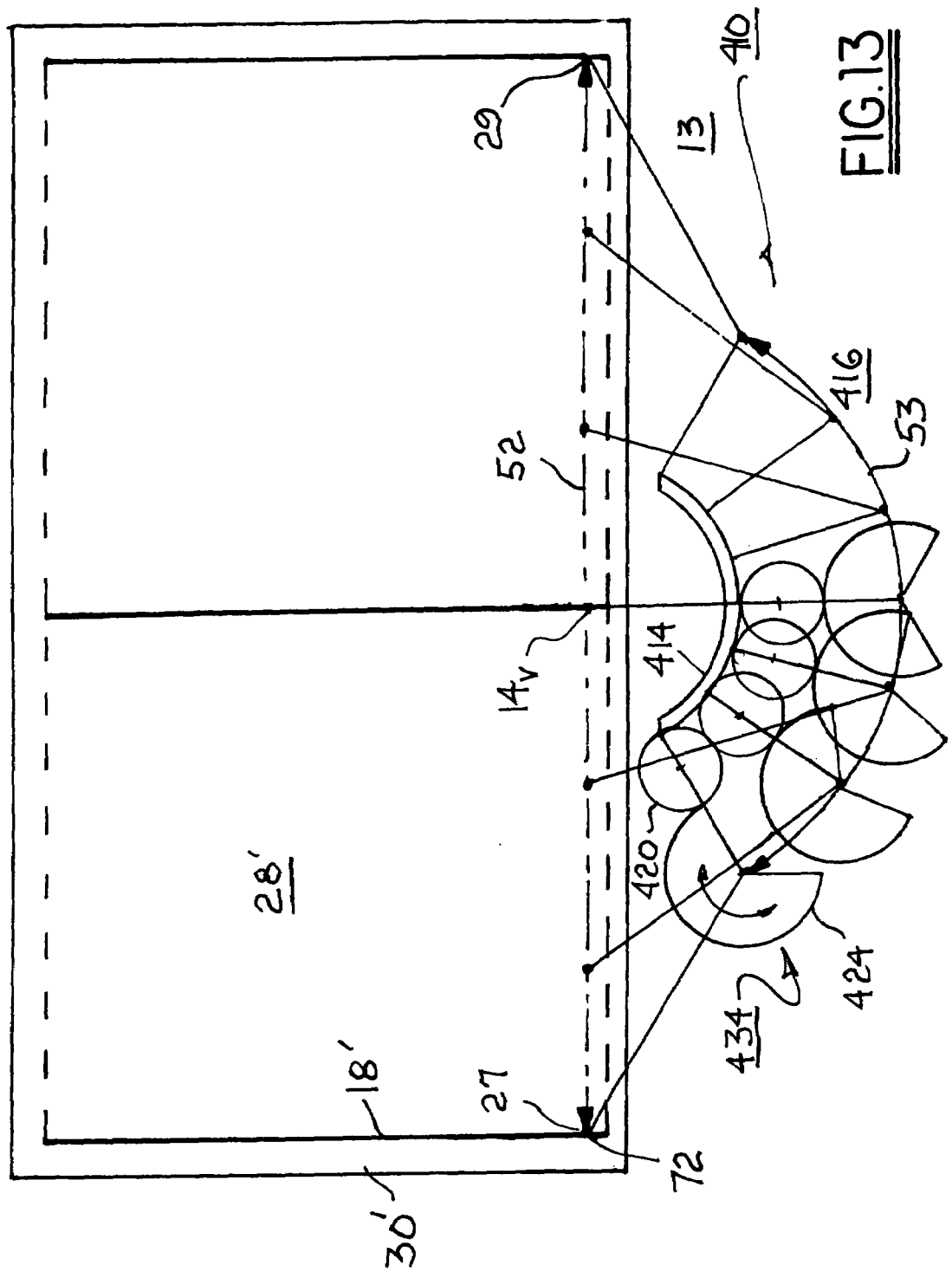
FIG. 13 is a schematic view of a fourth embodiment in accordance with the invention.
Figure 14:
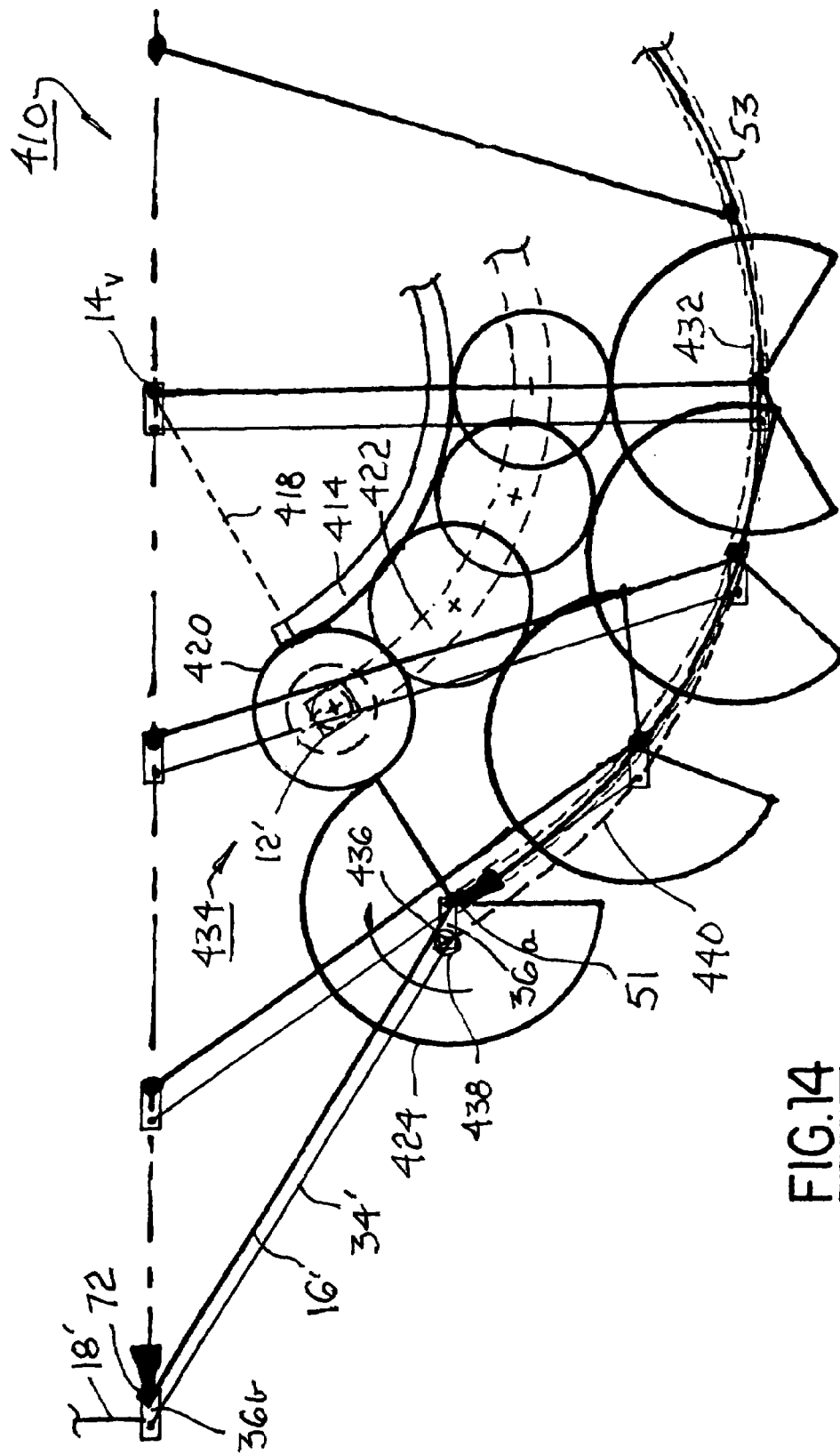
FIG. 14 is a detailed view of the mechanism of the embodiment shown in FIG. 13.

Referring to FIGS. 13 and 14, fourth embodiment 410 including gear train 434 is shown, which mechanism in fact desirably eliminates half of arm 16, all of track 48 and link 50, and pivot point 14.

A first gear segment 414 defining an arcuate rack having gear teeth along its outer edge is fixedly mounted to a plate 416 or directly to a vehicle 13. Gear 414 has a radius 418 and a center of curvature at a virtual pivot point $14_v$ (also referred to herein as a virtual pivot axis of first gear 414) coincident with prior art pivot point 14. Preferably, the angle subtended by gear segment 414 is equal to the nominal sweep angle subtended by wiper system 410 on windshield 30'. In the example shown in FIGS. 13–14, this angle is 120°.

A second gear 420 is disposed to mesh with first gear 414 and to travel along gear 414 by rotation, one-half cycle of such travel being shown in FIGS. 13–14. Gear 420 is mounted to the rotor of a oscillating motor 12' having a stator retrained from rotation by being disposed for sliding motion along a first curved track 422. Motor 12' is connected by flexible leads (not shown) to a source of power (not shown), and to a conventional control system (not shown) for varying the period and direction of rotation of motor 12'. Thus, as the rotor rotates, the motor 12' and second gear 420 are drawn along first gear 414 in an arcuate path concentric with virtual pivot point $14_v$.

A third gear 424 is disposed to mesh with second gear 420 and thus to be both rotated by and drawn along with second gear 420 during rotation thereof as just described. Preferably the radius of third gear 424 is one-half the radius of first gear 414, and the excluded angle of third gear 424 (240°) is twice the angle of first gear 414 (120°). The radius of second gear 420 is not critical, although the radii of all three gears may be optimized to minimize the footprint of the gear train on vehicle 13 and to provide maximum vertical clearance between the gear train and windshield 30'.

Third gear 424 engages second gear 420 at a point diametrically opposite from the point at which second gear 420 engages first gear 414 such that the axes of gears 420,424 are always aligned with, and rotate about, virtual pivot point $14_v$. Preferably, the axis of third gear 424 is provided with guide means similar to the guide means shown for embodiment 310, comprising, for example, a post and roller similar to post 330a and roller 336a (FIGS. 9–10) extending into an arcuate guide slot 432.

Figure 14A:
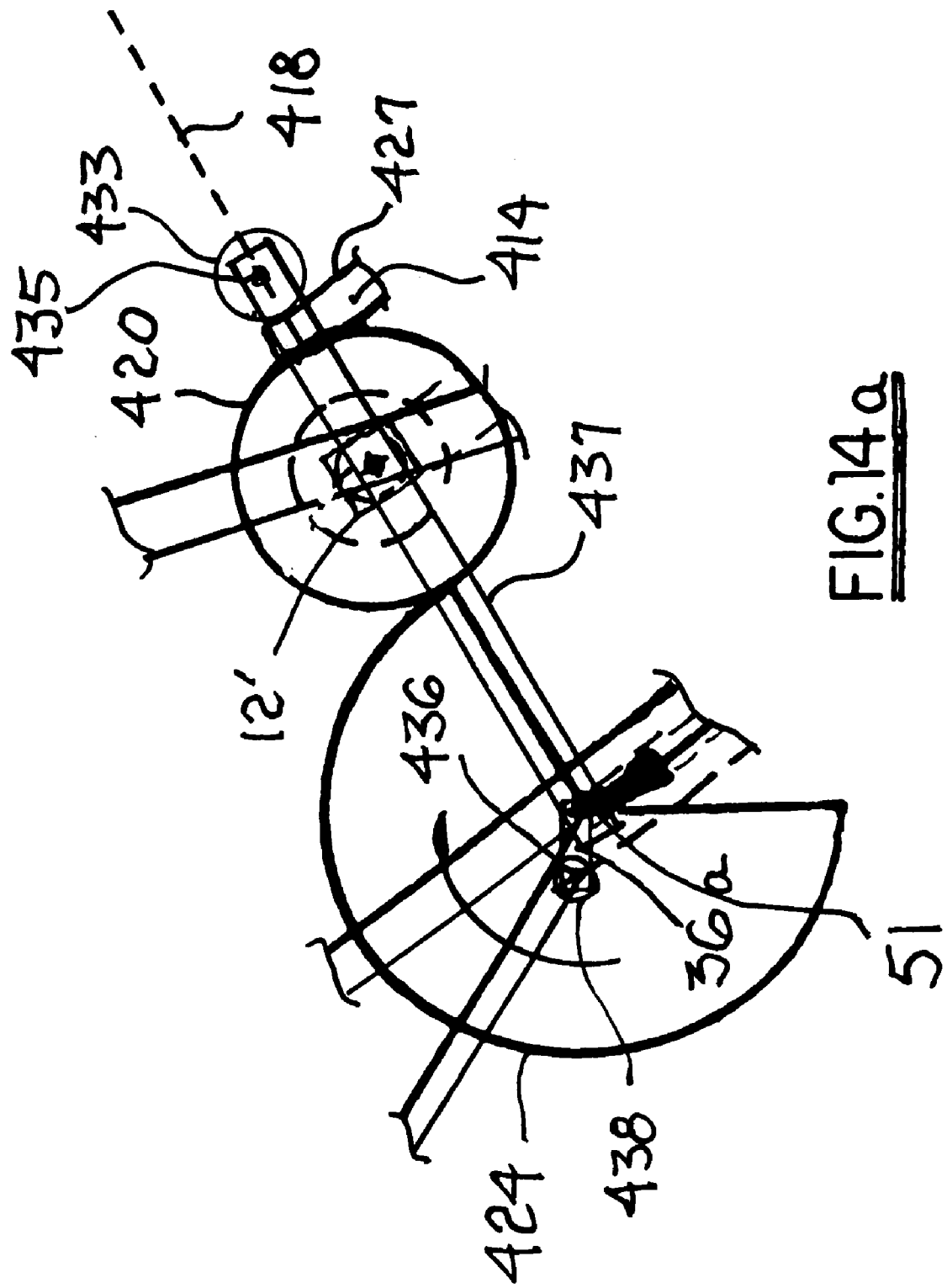
FIG. 14a shows a variation of the fourth embodiment shown in FIG. 14.

Referring to FIG. 14a, alternatively, a gear rack 427 may be added to the inner edge of first gear 414, and fourth gear 433 having an axis 435 may be mounted for rotation along rack 427 opposite second gear 420. When the axes of the second, third, and fourth gears are yoked together as by yoke strap 437, the positional stability of third gear 424 is substantially enhanced.

First, second, and third gears 414,420,424 define a gear train 434 for translating point 51 along an arcuate track 53, identical with the action of prior art link 50 when pivoted about prior art point 14.

Symmetrically mounted on third gear 424 is a wiper arm 16' for rotation and translation by train 434. As motor 12' is actuated, beginning (in FIGS. 13–14) in a counter-clockwise direction, outer end 72 of wiper arm 16' is drawn across windshield 30 in a linear path 52 from left extreme 27 to right extreme 29. Reversal of motor 12' to clockwise rotation causes the motion of end 72 to be reciprocated from right extreme 29 back to left extreme 27.

Wiper blade assembly 18' is attached to wiper arm 16' as follows. Assembly 18' may include well-known components such as hinges, springs, a rubber squeegee blade, and the like to promote proper wiping of a glass surface which need not be illustrated or discussed separately here. To maintain a vertical attitude of assembly 18' during translation of arm end 72, a parallelogram arrangement is required. To avoid a reference pivot point 42, as shown in FIG. 2, which would, like pivot point 14, require mounting on windshield 30, a first tab 36a is pivotably mounted to the inner end of wiper arm 16' at point 51, and a second tab 36b is pivotably mounted conventionally to outer end 72. An attitude arm 34' is disposed between tabs 36a,36b parallel with wiper arm 16'. To maintain horizontality of both tabs during actuation of embodiment 410, the inner end of arm 34' is also provided with a post 436 and roller 438 for following a guide slot 440 offset from wiper arm guide slot 432. Preferably, post 436 extends from tab 36a in an opposite direction from the wiper arm post, and guide slot 440 is formed in an overlying cover means (not shown) for the apparatus.

Thus, as wiper arm end 72 is drawn along linear path 52, wiper blade assembly 18' sweeps a rectangular field 28' on windshield 30, in accordance with the principal object of the invention. Significant benefits of embodiment 410 are that the mechanism is highly compact and allows wiper end 72 to overlap windshield 30 without requiring a pivot point 14. Of course, when the wiper blade assembly is mounted at a point inboard or outboard of point 72 on arm 16', then the resulting wiped field 28' is not rectangular but rather is rectarcuate, either concave or convex upwards, respectively.

The footprint of a wiper mechanism in accordance with the invention may be altered by changing the length of wiper arm 16', and by changing the path of the inner end of the wiper arm by using cam (non-circular or varying-radius) gears for the first and third gears, to simulate the motion exhibited by embodiment 410. An advantage of doing so is that the gear train can be further removed from path 52, allowing the mechanism to be placed lower in the tailgate of a vehicle, and allowing tab 36b to be more nearly centered on wiper blade assembly 18'.

Figure 15:
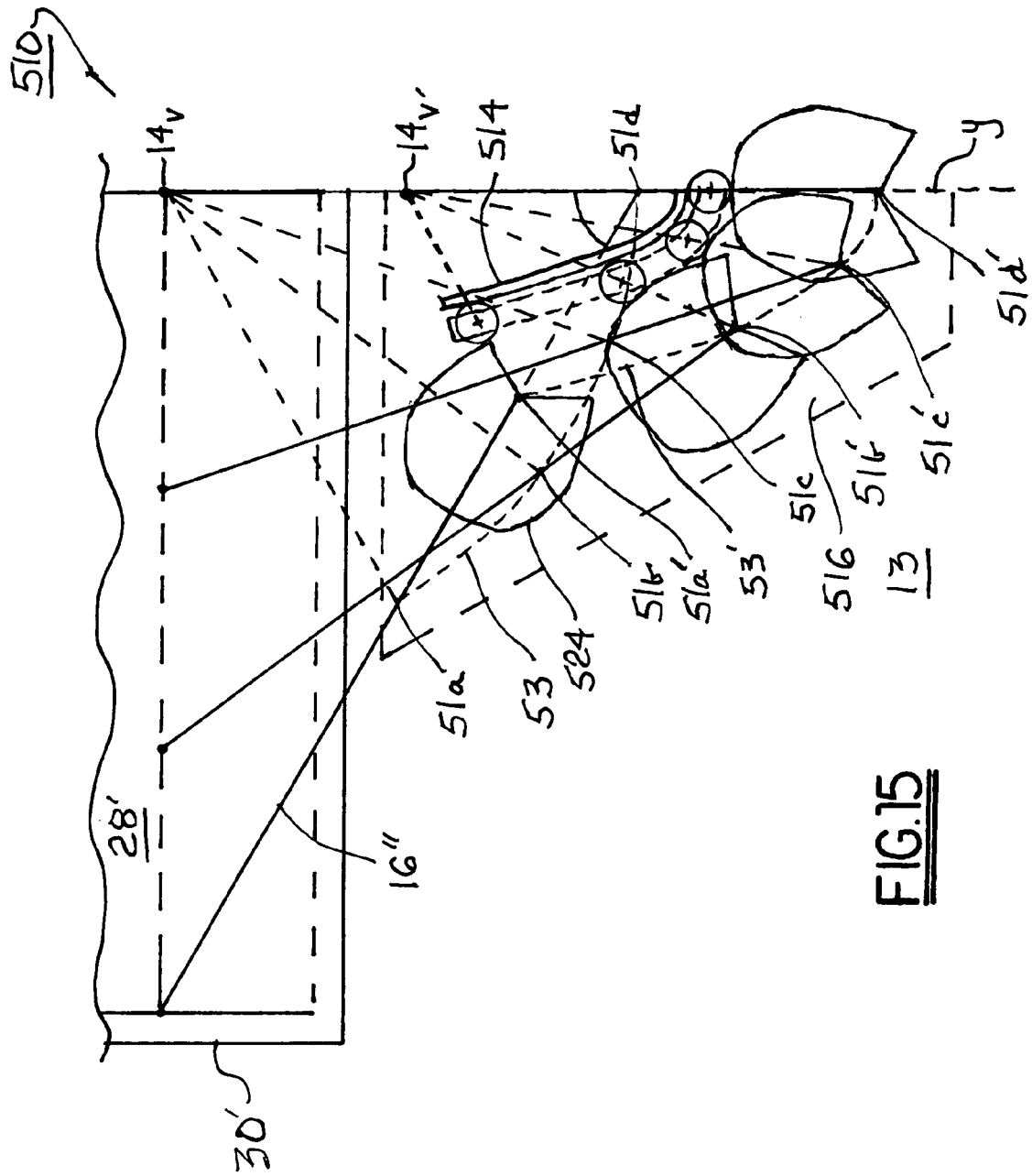
FIG. 15 is a schematic view of a fifth embodiment in accordance with the invention.

Referring to FIG. 15, fifth embodiment 510 (only the left half shown, which is a mirror image of the right half) is similar in concept and actuation to fourth embodiment 410. However, the position of virtual pivot point $14_y$ is lowered along the y-axis to a point $14_y$, non-overlapping the surface of windshield 30'. Point 51a is no longer at the rotational axis of the third gear but still must follow circular path 53 as before, and must reach point 51d at the midpoint of the wiper sweep to duplicate the action of the other embodiments.

A new point 51a' is selected such that a new wiper arm 16" is longer than wiper arm 16'. The inner end of wiper arm 16" at point 51a' defines the axis of rotation of a new third (cam) gear 524. A new first (cam) gear 514 is fixedly mounted to a base plate 516 or to vehicle 13. A circular second gear 520 is disposed between the first and third cam gears and is driven by motor 12' along a non-circular track 522, analogous to the apparatus and motion of the second gear and motor in embodiment 410. The radius 518 of first gear 514 is minimized when aligned with point 51a' and then increases non-linearly until aligned with point 51d' at mid-sweep. The radius of third gear 524 is also minimized when radius 518 is minimized and then increases as radius 518 increases such that the ratio of the two radii is constant, preferably 2:1. Thus, new point 51' follows a new path 53'from point 51a' to 51d', causing old point 51 to follow the correct circular path 53 from point 51a to point 51d.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A system for wiping a windshield of a vehicle in a rectangular field, including a wiper arm assembly, a wiper blade assembly operationally attached to said wiper arm assembly, and means for rotating and translating said wiper arm assembly to cause said wiper blade assembly to track in a linear path across said windshield, wherein said means for rotating and translating comprises:
    a) a mounting plate;
    b) a gear train including a first gear disposable adjacent said windshield, a second gear meshed with said first gear, and a third gear meshed with said second gear, said first, second, and third gears having first, second, and third axes, respectively, included in a straight line including a virtual pivot point, said first gear being non-rotationally attached to said mounting plate;
    c) a first non-linear track formed in said mounting plate;
    d) a motor having a stator and a rotor, said stator being slidable in said first track, and said rotor being supportive of said second gear; and
    e) a wiper arm fixedly attached at an inner end thereof to said third gear,
    wherein rotation of said second gear by said motor causes an outer end of said wiper arm to be drawn in a linear path across said windshield.

2. A system in accordance with claim 1 further comprising a second track formed in said mounting plate for guiding said third gear in motion about said virtual pivot point.

3. A system in accordance with claim 2 further comprising:
    a) an attitude arm having inner and outer ends;
    b) a first tab extending between said inner end of said wiper arm and said inner end of said attitude arm; and
    c) a second tab extending between said outer end of said wiper arm and an outer end of said attitude arm, defining a parallelogram arrangement thereamong, said wiper blade assembly being fixedly attached to said second tab.

4. A system in accordance with claim 2 wherein said first and second tracks are circular and concentric upon said virtual pivot point.

5. A system in accordance with claim 2 wherein at least one of said first and third gears is a non-circular gear defining a cam gear and wherein said first and second tracks are non-circular.

6. A system in accordance with claim 1 wherein the angle subtended by said first gear is one-half the angle subtended by said third gear.

7. A system in accordance with claim 1 wherein the radius of said third gear is one-half the radius of said first gear.

8. A system in accordance with claim 1 wherein said system has a nominal sweep angle between sweep extremes of about 120 degrees.

* * * * *